Patented Dec. 9, 1941

2,265,785

UNITED STATES PATENT OFFICE 2,265,785

MANUFACTURE OF METHACRYLIC ACID ESTERS

George Edwin Wainwright and Joseph Horsefield Brown, Norton-on-Tees, England, assignors to Imperial Chemical Industries Limited, a corporation of Great Britain No Drawing. Application October 21, 1938, Serial No. 236,345. In Great Britain October 28, 1937

4 Claims. (Cl. 260—486)

This invention relates to the manufacture of methacrylates and more particularly to the manufacture of lower alkyl methacrylates such as methyl methacrylate.

It is known to manufacture methacrylic esters of monohydric alcohols by reacting acetone cyanhydrin with concentrated or fuming sulphuric acid at a raised temperature, and subsequently heating the reaction mixture with an appropriate alcohol with or without added water.

This invention has an object to devise a more efficient method of manufacturing the lower alkyl methacrylates. A further object is to devise a method whereby the above mentioned reactions can be more efficiently performed. A further object is to devise a method whereby the above reactions can be made to operate more rapidly.

Further objects will appear hereinafter. These objects are accomplished by the following invention.

We have found that the method mentioned above can be made to operate more rapidly, e. g. the time for obtaining the ester can be reduced from 10 hours to about 2 hours, if the second part of the method, namely the heating of the reaction mixture with the alcohol and water is done by adding both an alcohol of the type R—O—H (where R is a lower alkyl radical containing not more than 4 carbon atoms) and water slowly to the reaction product of acetone cyanhydrin and sulphuric acid while maintaining the temperature and pressure so that the ester is formed and then removed by distillation. Preferably the ester is distilled off through a fractionating column.

The following examples illustrate but do not limit our invention all parts being by weight.

Example 1

Acetone cyanhydrin (1275 parts 95% pure) was mixed with sulphuric acid containing 2% SO₃ (2175 parts) and copper (5 parts) at a temperature of 80° C. and then heated to a temperature of 150° C. for a period of 5 minutes. To the reaction mixture was then added a mixture of water (540 parts) and methanol (720 parts) containing hydroquinone (2.5 parts) at a uniform rate over a period of 2 hours, and vapor evolved from the reaction mixture during the addition was removed through a 5-plate fractionating column, condensed and collected. During this stage the reaction mixture was maintained at a temperature between 125° C. and 135° C. so that the product distilled at a steady rate. On completion of the addition steam was admitted to the flask in order to steam distil out the last traces of ester remaining, the distillate during this stage being combined with that from the previous stage.

The total product separated into two layers consisting of (a) an upper layer (1338 parts) containing 82.1% of methyl methacrylate and (b) a lower aqueous layer (500 parts) containing 30% methanol and traces of ester. The yield of methyl methacrylate obtained in the upper layer was 77% calculated on the amount of acetone cyanhydrin used.

Example 2

Acetone cyanhydrin (425 parts 95% pure) was mixed with 100% sulphuric acid (725 parts) and copper (2 parts) at a temperature of 85° C. and then heated to 125–130° C., for approximately 1¼ hours. To the hot reaction mixture was then added a mixture of water (180 parts) and ethyl alcohol (345 parts) containing hydroquinone (5 parts) at a uniform rate over a period of an hour; the temperature at first rose to 148° C. and then began to fall. Heating was then commenced to maintain the temperature at 130–150° C. allowing the product to distil off through a fractionation column; when all the water-alcohol mixture had been added the ester remaining in the vessel was removed by steam distillation.

The total product separated into two layers consisting of (a) an upper layer (549 parts) containing 67% of ethyl methacrylate and (b) a lower layer (176 parts) containing 30% of ethyl alcohol and a little ester, the remainder being water. The yield of ethyl methacrylate in the upper layer was 67% calculated on the acetone cyanhydrin used.

Example 3

Butyl methacrylate was made by the procedure of Example 2 the mixture of water and ethyl alcohol being replaced by water (180 parts) and butyl alcohol (555 parts) fed simultaneously from separate vessels, and the temperature during distillation being maintained between 130 and 155° C. The yield of butyl methacrylate calculated on the acetone cyanhydrin used was 62%.

Example 4

Butyl methacrylate was prepared as in Example 3 the pressure being maintained during the reaction between ½ and ¾ of atmospheric, while the temperature was kept at 120–130° C. The yield was 68% calculated on the acetone cyanhydrin used.

Example 5

Acetone cyanhydrin (12.7 parts 95% pure) was added to 100% sulphuric acid (22 parts) containing copper, while maintaining the temperature below 90° C. The mixture was then heated for 1 hour at 130° C. when a mixture of methanol (9.6 parts) and water (5.4 parts) containing hydroquinone was run in over a period of two hours while product was allowed to distil through a fractionating column. The temperature during this process was 128–130° C. At the end of the addition residual ester was steam distilled from the reaction vessel. The total distillate (22 parts) was treated with a saturated solution (21 parts) of common salt when an upper layer (12.1 parts) was formed containing 94% methyl methacrylate. The lower brine layer was discarded. The ester present in the upper layer represents a yield of 80% on the acetone cyanhydrin used.

In the process according to the present invention the amount of alcohol to be added to the acetone cyanhydrin-sulphuric acid mixture is not modified by adopting the variation in procedure, and in general it may be stated that amounts between 1 mol and 2 mols per mol of acetone cyanhydrin are satisfactory, though to obtain the maximum yields not less than 1.5 mols should be used. The amount of water should not exceed 4 mols per mol of cyanhydrin nor be less than 0.5 mol, quantities of the order of 2 mols being satisfactory. In the case of the alcohols miscible with water the water and the alcohol are most satisfactorily added as a mixture in the chosen proportions. The rate of addition of the mixture does not appear critical and we have obtained satisfactory results using such rates that between half an hour and three hours are required to add all the mixture. In general, rates giving an addition time of two hours are preferable. For the higher alcohols which may be used in our invention and which are not miscible with water, separate feeds for water and alcohol are required.

The process may be carried out at either ordinary or reduced pressures, e. g. half an atmosphere, and the temperature during the water-alcohol addition should be such that distillation proceeds steadily at the prevailing pressure. When preparing the propyl and butyl esters at atmospheric pressures, temperatures between 130° and 160° C. are convenient, with the methyl ester temperatures of 100–120° C. suffice, though temperatures up to e. g. 150° C. may be used. With pressures of about half an atmosphere the temperature limit for the propyl and butyl esters may also be extended down to approximately 100° C. Temperatures much above 160° C. are to be avoided, since polymerisation may ensue and also side reactions leading to the formation of unwanted products. We may minimize the tendency for polymerisation to occur by having present during the heating an antipolymerisation material such as tannic acid, sulphur hydroquinone, pyrogallic acid or freshly precipitated copper.

The usual method of reacting acetone cyanhydrin with sulphuric acid as the first stage in the formation of methacrylic acid esters involves heating a mixture of the two to temperatures in the neighbourhood of 140° C. and when it is proposed to perform the esterification step immediately afterwards it is convenient to add the water and alcohol to the hot reaction mixture. It is then not necessary to apply heat during the initial period of the alcohol-water addition, though it is subsequently necessary in order to maintain the reaction vessel at such a temperature that the ester distils over.

When the whole of the alcohol and water have been added a continued heating for a short time only, suffices to recover substantially all the product, although it is advisable for maximum yields to subject the residue in the reaction vessel to a short period of steam distillation. In many cases the reaction mixture may be steam distilled directly after all the alcohol has been added with very satisfactory results. The ester distilling off through the fractionating column is condensed together with water, alcohol and a little acid which may pass through the column. If allowed to stand this product separates into two layers, the upper one being the larger and consisting chiefly of ester together with a small proportion of water, unchanged alcohol and methacrylic acid, while the lower layer consists chiefly of water together with unchanged alcohol amounting to 20–30% of the lower layer and a small proportion of ester. The two layers can then be separated and the upper one worked up to give pure ester, while the lower one may be rejected, or it may be mixed with more alcohol and used to treat a further quantity of the acetone cyanhydrin-sulphuric acid reaction product. By adopting this recycling of the lower layer, its ester content can be recovered in a simple manner and its alcohol content converted to ester. In another method of working up the product where the lower layer is not to be returned to the reaction mixture, the whole of the distillate may be washed with brine and the aqueous layer allowed to settle out and then removed. In this way loss of ester in the aqueous layer is minimized.

As many apparently widely different embodiments of this invention may be made without departing from the spirit and scope thereof it is to be understood that the invention is not limited to the specific embodiments thereof except as defined in the appended claims.

We claim:

1. A method for the manufacture of lower alkyl methacrylates which comprises slowly and simultaneously adding to the reaction product of acetone cyanhydrin and sulphuric acid, both water and an alcohol having less than five carbon atoms, from 0.5 to 2 mols of water being added per mol of acetone cyanhydrin, while maintaining a temperature between 100° C. and 160° C. and withdrawing the ester by distillation as formed.

2. A method for the manufacture of methyl methacrylate which comprises slowly and simultaneously adding methanol and from 0.5 to 1.5 mols of water per mole of acetone cyanhydrin to the reaction product of acetone cyanhydrin and sulfuric acid, maintaining the temperature of the resulting mixture between 100° and 150° C. and withdrawing the methyl methacrylate by distillation as formed.

3. A method for the manufacture of ethyl methacrylate which comprises slowly and simultaneously adding ethyl alcohol and from 0.5 to 1.5 moles of water per mol of acetone cyanhydrin to the reaction product of acetone cyanhydrin and sulfuric acid, maintaining the temperature of the resulting mixture between 100° and 150° C. and withdrawing the ethyl methacrylate by distillation as formed.

4. A method for the manufacture of butyl methacrylate which comprises slowly and simultaneously adding butyl alcohol and from 0.5 to 1.5 mols of water per mol of acetone cyanhydrin to the reaction product of acetone cyanhydrin and sulfuric acid, maintaining the temperature of the resulting mixture between 100° C. and 160° C. and withdrawing the butyl methacrylate by distillation as formed.

GEORGE E. WAINWRIGHT.
JOSEPH H. BROWN.